United States Patent [19]

Willis et al.

[11] Patent Number: 4,910,998

[45] Date of Patent: Mar. 27, 1990

[54] FLUID DETECTION SYSTEM AND METHOD HAVING A COAXIAL CABLE WITH SOLID, STRANDED DIELECTRIC ELEMENTS

[75] Inventors: Frank R. Willis, South Holland; Sitaram Rampalli, Tinley Park; Vijay K. Chopra, Palos Park; Robert D. Perelman, Homewood, all of Ill.

[73] Assignee: Andrew Corporation, Orland Park, Ill.

[21] Appl. No.: 45,887

[22] Filed: May 1, 1987

[51] Int. Cl.$^4$ .......................... G01M 3/16; H01B 7/32
[52] U.S. Cl. ................. 73/40.5 R; 174/11 R; 174/29; 324/525; 324/533; 324/534; 340/605
[58] Field of Search ................. 174/11 R, 28, 29, 109, 174/115; 73/40, 40.5 R; 200/61.04; 324/519, 525, 533, 534; 333/237, 243; 340/604, 605; 361/280, 284, 285, 286

[56] References Cited

U.S. PATENT DOCUMENTS

| | | | |
|---|---|---|---|
| 2,056,085 | 9/1936 | Alles | 174/11 R |
| 2,217,162 | 10/1940 | Ducati | 174/28 |
| 2,488,211 | 11/1949 | Lemon | 174/29 |
| 3,981,181 | 9/1976 | Ochiai | 73/40.5 R |
| 4,029,889 | 6/1977 | Mizuochi | 174/11 R |
| 4,095,174 | 6/1978 | Ishido | 174/11 R X |
| 4,206,402 | 6/1980 | Ishido | 73/40.5 R X |
| 4,346,253 | 8/1982 | Saito et al. | 174/29 |
| 4,570,477 | 2/1986 | Sugibuchi | 174/11 R X |
| 4,594,638 | 6/1986 | Suzuki et al. | 174/11 R X |

FOREIGN PATENT DOCUMENTS

| | | | |
|---|---|---|---|
| 2533257 | 2/1977 | Fed. Rep. of Germany | 174/11 R |
| 2807084 | 8/1979 | Fed. Rep. of Germany | 340/605 |
| 519937 | 3/1955 | Italy | 174/29 |
| 492279 | 9/1938 | United Kingdom | 174/29 |
| 728496 | 4/1955 | United Kingdom | 174/29 |
| 86-07483 | 12/1986 | World Int. Prop. O. | 340/604 |

OTHER PUBLICATIONS

Yu. N. Zhigulin et al., "Locating a Leak in a Pipeline by Means of a Coaxial Test Cable", Translated from Izmeritel'naya Teknika, No. 5, pp. 40-41, May, 1975.

Primary Examiner—Laramie E. Askin
Attorney, Agent, or Firm—Stephen G. Rudisill

[57] ABSTRACT

A fluid detection system includes a cable which is capable of being dried easily after coming into contact with the fluid being detected and displays a measurable change in characteristic impedance immediately upon contact with the fluid. The cable comprises an inner conductor and a cylindrical outer conductor disposed in a substantially parallel and coaxial relationship with each other with a dielectric detection layer coaxially disposed between the inner and outer conductors. The outer conductor is of an open braided construction which permits easy passage therethrough of the fluid to be detected. The detection layer comprises a pair of solid dielectric elements stranded around the inner conductor in a double helical configuration and defining an air gap between the two conductors which is adapted to retain the fluid so as to measurably change the characteristic impedance of the cable. A coating of dielectric material is provided around the solid inner conductor, the thickness of which can be controlled to adjust the change in characteristic impedance resulting from the presence of fluid within the dielectric layer. The improved cable construction allows the dielectric layer to be dried quickly even after the cable has been immersed in the fluid so that successive fluid detection measurements may be made without delay.

10 Claims, 1 Drawing Sheet

FLUID DETECTION SYSTEM AND METHOD HAVING A COAXIAL CABLE WITH SOLID, STRANDED DIELECTRIC ELEMENTS

FIELD OF THE INVENTION

The present invention generally relates to sensor systems for detecting the presence or leakage of a liquid. More particularly, this invention relates to sensor system utilizing a coaxial cable type sensor which can be used for fluid detection by relying upon the change in impedance between inner and outer conductors of the coaxial cable due to permeation of fluid therein.

BACKGROUND OF THE INVENTION

A variety of applications exist requiring accurate and sensitive detection of fluid leakage or determination of fluid levels. For instance, the transportation of fluids such as liquid chemicals, various oils including crude oil, gasoline, petroleum, and other liquid organic solvents, is routinely performed via underground pipelines. Early detection of leaks in such fluid transport systems is critical in view of a number of factors including the dangers of explosion, corrosion and environmental pollution arising due to leakage of the fluid being transported. The situation is complicated because the pipe lines are often located in places not easily accessible and are normally covered with heavy thermally insulating and corrosion resistant layers.

A fairly conventional approach to this problem is the use of leakage detection cables in systems which are based upon the transmission of pulse signals over a pair of coaxially-arranged conductors and measurement of any variation in the characteristic impedance between the conductors in order to determine the presence of a fluid. More specifically, in such systems detection of the presence of a fluid is accomplished by using a coaxial cable having a porous outer conducting layer and a dielectric insulation layer laid out in such a way that fluid permeating the outer conductor fills air spaces within the dielectric material and thereby causes the dielectric permittivity as well as the characteristic impedance at a particular location to change. In coaxial cable-based fluid detection systems, the cable is energized by a pulse signal generator and the appearance along the cable of either reflected or standing waves arising from deviation of the characteristic impedance of the cable from its initial value is recorded. The extent of reflection or absorption of pulse signals so measured is then used to determine fluid level. Such coaxial detection cables permit remote determination of the presence of fluid in the vicinity of the cable. This technique of measurement is well known in the field of fluid detection and will not be discussed here in detail.

Conventional fluid detection cables are generally composed of a pair of coaxial conductors separated from each other by an insulation material which is partially porous to the liquid being detected and permits retention of fluid within air gaps defined in the material to cause the electrical characteristics between the coaxial conductors to change measurably in presence of the fluid. Typically, coaxial detecting cables are constructed with a solid inner conductor coaxially surrounded by a hollow braided outer conductor with the space between the conductors being filled by a porous dielectric layer such as fiberglass yarn. The presence of fluid is detected by the change in cable impedance when the air spaces in the dielectric yarn are filled with the fluid. A common problem with such cables is that the impedance change occurs at a slow pace because of the time required for the fluid to permeate through the outer conductor and settle into the air spaces defined within the fiberglass yarn. In addition, once a cable has been immersed in the fluid being detected and the resultant change in impedance recorded, drying the dielectric material, i.e., getting rid of the fluid that has accumulated in the air spaces within the dielectric, is quite problematic and involves substantial effort and time in returning the changed characteristic impedance of the cable back to its initial value before proceeding with successive fluid detection measurements.

SUMMARY OF THE INVENTION

Keeping in view the above mentioned problems, it is a primary object of the present invention to provide an improved fluid detection system employing a cable of the coaxial kind which can be dried easily for reuse after it has been brought into contact with the fluid being detected.

Another significant object of this invention is to provide a fluid detection system including a fluid detecting cable in which a measurable change in cable impedance occurs immediately when the cable comes into contact with the fluid being detected.

A related object of the present invention is to provide a fluid detection system including a cable of the above kind with a construction permissive of conveniently adjusting, during cable manufacture, the characteristic impedance change undergone by the cable when it is immersed in a fluid.

Yet another object is to provide a fluid detecting system including a cable of the above kind which is also mechanically strong and which is less susceptible to fluctuation in cable impedance as a result of displacement of the dielectric layer.

A further object is to provide a fluid detection system including a cable with a construction that is suitable for detection of fluids having relatively low sensitivity to detection due to their lower dielectric constants.

Other objects and advantages of this invention will become apparent from the following description when taken in conjunction with the accompanying drawings.

In accordance with this invention, the above objects are accomplished by means of a detection cable construction which has a dielectric layer comprising a plurality of solid dielectric elements stranded around the inner conductor of the cable. The outer conductor of the cable is of an open-braided construction having well defined passages through which a fluid may readily pass into the area between the two conductors. According to a preferred embodiment, a pair of solid dielectric elements are stranded around the inner conductor in a double helical configuration. The dielectric elements are stranded in a spaced relation to each other so as to define a substantially continuous air gap therebetween. The well defined passages in the braided outer conductor facilitate easy passage of fluid which is then accommodated within the air gap in the dielectric layer so as to measurably change the impedance of the detection cable. The dielectric elements re composed of a material which is resistant and impervious to the fluid being detected and any fluid retained within the dielectric air gap can be easily removed after a particular fluid detection measurement has been finished.

Also in accordance with this invention, a relatively thin coating of dielectric material is provided on the inner conductor. The coating provides a degree of control over the change in cable impedance in presence of the fluid and also eliminates the possibility of the outer and inner conductors contacting each other and causing a short circuit. The impedance change which the detecting cable undergoes when the air space defined therein is filled with fluid can be adjusted by varying the ratio of the dielectric volume to the internal volume of the cable in relation to the thickness of the dielectric coating on the outer surface of the inner conductor. The use of a relatively short pitch on the stranding of the dielectric elements and the double helical configuration provides the cable with substantial mechanical strength.

While the invention will be described in connection with certain preferred embodiments, it will be understood that it is not intended to limit the invention to these particular embodiments. On the contrary, it is intended to cover all alternatives, modifications and equivalent arrangements as may be included within the spirit and scope of this invention as defined by the appended claims.

DESCRIPTION OF THE PREFERRED EMBODIMENT

Figure 1:
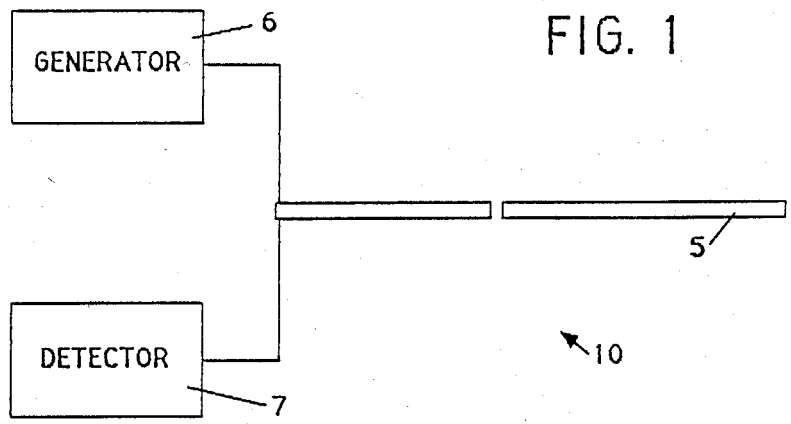
FIG. 1 illustrates a fluid detection system in accordance with the present invention.
Figure 2:
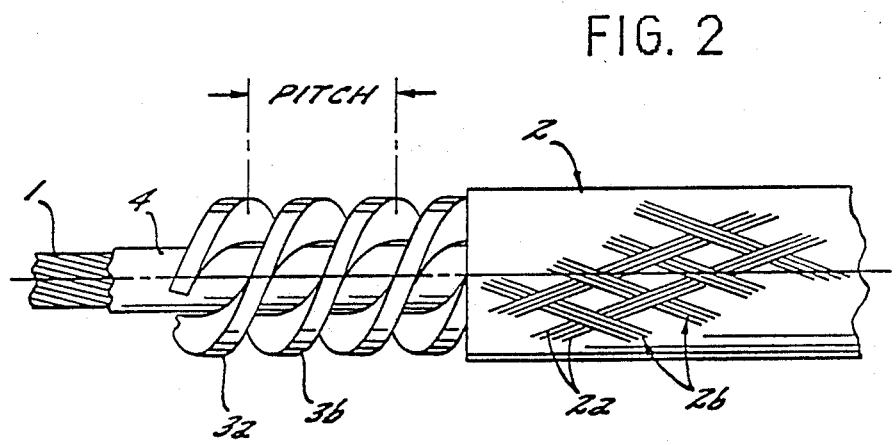
FIG. 2 is a cutaway view showing the various layers comprising a coaxial fluid detection cable according to this invention.

Referring initially to FIG. 1, a fluid detection system is generally designated by the reference numeral 10. The system 10 includes a fluid detection cable 5, and a signal generator 6 and a signal detector 7 which are electrically connected to the cable 5. The signal generator 6 transmits pulse signals over the cable 5 which are reflected by the cable. The reflected signals are received by the signal detector 7 and processed to measure any variation in the characteristic impedance of the cable 5 in order to determine the presence of fluid in the cable 5. As shown in FIG. 2, the fluid detection cable 5 includes an inner conductor 1 forming the core of the cable. The conductor 1 is generally formed of a solid conducting material such as copper or aluminum. It is preferably composed of a plurality of nickel-plated copper wires which are tightly stranded together to form a composite, solid conductor. The inner conductor 1 is arranged to be in a substantially coaxial and parallel relationship with an outer conductor 2 which is in the form of a cylindrical reticulate body whereby an axially extending gap is defined between the inner and outer conductors. The outer conductor 2 is formed of an open braided construction using a plurality of metallic wires 2a generally composed of a conducting material such as copper or aluminum; the wires of the braid are preferably nickel-plated copper wires. Nickel plating provided on the outer surface of the inner and outer conductors provides corrosion protection without affecting the conducting properties.

Various types of braiding may be used for forming the braided outer conductor. However, it is preferable that the space between groups of wires 2b used in the braiding process be made equal to the space actually occupied by the wires. This ensures that the passages defined by the braiding of the outer conductor constitute at least about 25% of the total area of the outer conductor, thereby facilitating passage of fluid readily into the gap between the coaxial conductors.

In conventional fluid detection cables, the gap between the inner and outer coaxial conductors is filled with a layer of porous dielectric material such as fiberglass yarn which is capable of retaining fluid within the plurality of air spaces defined therein. A common problem associated with such detection cables is that once the cable is subjected to a fluid detection operation, for instance, by immersing the cable in the fluid to be detected, an inordinately long period of time is required to dry the cable of permeated fluid in order to return the characteristic impedance of the cable to its initial value; this places a severe restraint in using such cables for successive fluid detection measurements. In addition, dielectric materials such as glass yarn are easily susceptible to displacement under field conditions thereby giving rise to the possibility of random shifts in characteristic impedance of the cable which make fluid detection measurements unreliable and inaccurate.

The above problems associated with coaxial fluid detection cables are solved in accordance with this invention by the provision of a plurality of solid dielectric elements strandedaround the inner conductor in such a way as to define axially extending air gaps between the coaxial conductors. More specifically, as shown, the dielectric layer is formed of a pair of solid dielectric elements 3a, 3b which are stranded over the inner conductor 1 according to a double helical configuration. The solid elements are spaced a prescribed distance from each other so as to define a spirally extending air gap between adjacent turns of the helically stranded dielectric elements 3a and 3b. Since the fluid is retained within the well defined air gap between the solid stranded dielectric elements and not within interstitial pores in the dielectric material, it is relatively easy to dry the cable after it has been immersed in the fluid. The dielectric material for the two solid elements is selected to be impervious and substantially inert to the fluid being detected, and is preferably a mixture of 80% high-density and 20% low-density polyethylenes. This material is suitable for detection of fluids such as water, gasoline and other chemicals which are commonly encountered in fluid detection application.

An added advantage accruing from the use of the solid dielectric elements is the possibility of using material having a dielectric constant which is substantially different from that of the fluid being detected; this in turn produces a rapid change in characteristic impedance when the fluid fills in the air gap defined by the dielectric elements, and directly contributes to faster response times in the fluid detection process. The cable construction according to the present invention is imminently suitable for use with water detection systems, a typical example of which is the detection of leaks in steam transport lines used with steam-based heating systems. The dielectric constant of water being substantially high (in the vicinity of 75 to 80) as compared to the dielectric constant of polyethylene (around 2.2 to 2.4), the presence of even a small amount of water within the dielectric air gap causes a substantially large characteristic impedance change which can be easily measured. Drying the cable after immersion into water is also easy and fast.

According to a significant feature of this invention, the change in characteristic impedance undergone by the detection cable when it is immersed in the fluid being detected is made conveniently adjustable, thereby making it possible to control the level of reflection produced by the presence of fluids inside the cable. In conventional fluid detection cables, a relatively large reflection of the pulse signals is produced from the presence of any wet spot along the length of the cable. It is hence difficult to detect multiple leaks along the length of the cable since reflections resulting from one leak can be strong enough to mask reflections from adjacent leaks. It is desirable in such cases to reduce the level of reflection in order that reflections arising out of different spots where fluid is present may be distinguished from each other.

In order to provide this capability of detecting multiple leaks, the external surface of the inner conductor 1 is provided with a dielectric coating 4, preferably of the same material used for the solid dielectric elements. It should be noted that the impedance change undergone by the cable when the dielectric air gap is filled with fluid relative to its "dry" impedance is inversely proportional to the volume of dielectric material contained between the inner and outer coaxial conductors. The characteristic impedance change can hence be increased by decreasing the ratio of the dielectric volume to the internal volume of the detection cable. In the absence of the dielectric coating, bringing about such an increase requires a change in the spacing between the dielectric elements stranded over the inner conductor; this change can complicate the overall manufacturing process. The provision of the dielectric coating serves as a convenient means for varying the overall dielectric volume inside the cable. Increasing or decreasing the thickness of the coating on the inner conductor, while keeping the ratio of the dielectric volume to the internal volume of the cable constant will result in a corresponding increase or decrease in the characteristic impedance of the cable when it is immersed in the fluid.

Accordingly, it is possible to construct the cable for use in detection of multiple leaks of fluids, such as water, which cause a relative high characteristic impedance change in the cable by increasing the thickness of the dielectric coating 4 so that the extent of reflection is correspondingly reduced. The thickness of the dielectric coating 4 can be decreased if the detection cable is to be used with fluids, such as gasoline, which do not produce a large shift in characteristic impedance when present within the dielectric air gap. The decreased thickness correspondingly increases the extent of reflections produced by the presence of such fluids and it hence becomes possible to accurately detect tee presence of fluids with relatively low dielectric constants.

The provision of the dielectric coating 4 on the inner conductor 1 provides an additional advantage by eliminating the possibility of the braided outer conductor contacting the inner conductor and causing a short circuit as the cable is placed into position or while it is actually being used.

The exemplary construction of the fluid detection cable according to this invention, as discussed with reference to FIG. 2, is for illustrative purposes only. It should be noted that the solid dielectric layer which defines the air gap need not be restricted to a double helical configuration. For instance, a single dielectric element may be helically stranded around the inner conductor and yet provide the aforementioned advantages, provided the pitch of the helically wound element is small enough to provide sufficient mechanical strength. Alternatively, more than two solid dielectric elements may be helically wound around the solid inner conductor at a relatively larger pitch so that sufficient air space is provided between the dielectric elements to readily accommodate fluid passing through the outer braided conductor. As yet another alternative, the solid dielectric layer may be provided in the form of solid sections extruded over the inner conductor with a plurality of splines extending along the length of the cable and defining longitudinally extending air spaces therebetween.

A fluid detection cable embodying the applicants' invention as set forth in the foregoing description was constructed and successfully tested for use with a water detection system. Typical construction specifications for such a water detection cable are set forth below:

Inner conductor-14 gauge, 19 strand nickel-plated copper wire; outer diameter 0.068 in.

Dielectric coating layer-outer diameter 0.080 in.

Solid dielectric element sections (each)-height 0.055 in., width 0.068 in., pitch 0.305 in.

Ratio of dielectric volume to internal volume of cable-0.55 to 0.60.

Dielectric material-a composite of 80% high-density and 20% low-density polyethylene.

Constructed according to the above specifications, the water detection cable exhibited a characteristic impedance when dry of 50 ohms and a characteristic impedance when immersed in water of 25 ohms.

From the foregoing, it is apparent that the present invention provides a fluid detection system including a cable of the coaxial type which exhibits a conveniently measurable change in characteristic impedance immediately upon contact with the fluid being detected. The cable is constructed in such a way that it can be dried easily after contact with a fluid so that the cable may be used to make successive measurements without undue delay. In addition, the cable can be constructed for use with detection of multiple fluid leaks by conveniently adjusting, during cable manufacture, the extent of change in characteristic impedance undergone by the cable when it contact the fluid being detected.

We claim:

1. A fluid detection system comprising a coaxial fluid detection cable located in a region where the intrusion of a fluid is to be detected, signal generating means for applying an electrical signal to said coaxial cable, and means responsive to said signal for detecting a change in the characteristic impedance of said coaxial cable, said coaxial cable consisting essentially of:

an inner conductor and a cylindrical outer conductor disposed in a substantially parallel and coaxial relationship with each other, said outer conductor being formed of an open braided construction defining a plurality of passages through which the fluid to be detected may pass into said coaxial cable, and a detection layer disposed in a substantially coaxial fashion between said inner and outer conductors, said detection layer comprising only non-porous dielectric material, said non-porous dielectric material forming an element which is helically and spatially disposed around the inner conductor and which defines a spirally extending air gap for accommodating the fluid which passes through said outer conductor so as to measurably change the characteristic impedance of said coaxial cable, said spirally extending air gap also permitting said fluid to be quickly and thoroughly exhausted from said coaxial cable.

2. The fluid detection system of claim 1 wherein the non-porous dielectric material is composed of a mixture by volume of 80% high-density polyethylene and 20% low-density polyethylene.

3. The fluid detection system of claim 1 wherein the non-porous dielectric material forms another element which is helically and spatially disposed around the inner conductor and defining a second spirally extending air gap.

4. The fluid detection system of claim 1 wherein the open braided outer conductor comprises a plurality of groups of electrically conductive elements braided together over said detection layer in a manner defining said passages between crossing conductive elements for the passage of the fluid.

5. A fluid detection system comprising a coaxial fluid detection cable located in a region where the intrusion of a fluid is to be detected, signal generating means for applying an electrical signal to said coaxial cable, and means responsive to said signal for detecting a change in the characteristic impedance of said coaxial cable, said coaxial cable consisting essentially of:
an inner conductor and a cylindrical outer conductor disposed in a substantially parallel and coaxial relationship with each other, wherein the inner conductor is coated with an electrically non-conductive layer impermeable to the fluid being detected;
said outer conductor being formed of an open braided construction defining a plurality of passages through which the fluid to be detected may pass into said coaxial cable, and
a detection layer disposed in a substantially coaxial fashion between said inner and outer conductors, said detection layer comprising only non-porous dielectric material, said non-porous dielectric material forming an element which is helically and spatially disposed around the inner conductor and which defines a spirally extending air gap for accommodating the fluid which passes through said outer conductor so as to measurably change the characteristic impedance of said coaxial cable, said spirally extending air gap also permitting said fluid to be quickly and thoroughly exhausted from said coaxial cable.

6. A fluid detection system comprising a coaxial detection cable located in a region where the intrusion of a fluid is to be detected, signal generating means for applying an electrical signal to said coaxial cable, and means responsive to said signal for detecting a change in the characteristic impedance of said coaxial cable, said coaxial cable consisting essentially of:
an inner conductor and a cylindrical outer conductor disposed in a substantially parallel and coaxial relationship with each other,
said outer conductor being formed of an open braided construction defining a plurality of passages through which the fluid to be detected may pass into said coaxial cable,
a detection layer disposed in a substantially coaxial fashion between said inner and outer conductors, said detection layer comprising only solid, non-porous dielectric material and including at least one solid, non-porous dielectric element stranded in a helical configuration around the inner conductor and defining an air gap for accommodating the fluid which passes through said outer conductor so as to measurably change the characteristic impedance of said coaxial cable, said air gap also permitting said fluid to be quickly and thoroughly exhausted from said coaxial cable, and a coating of solid, non-porous dielectric material provided around said inner conductor, the extent of change in characteristic impedance resulting from the fluid accommodated within said air gap being inversely proportional to the thickness of said dielectric material coating.

7. The fluid detection system of claim 6 wherein the at last one solid, non-porous dielectric element is composed of a mixture by volume of 80% high-density polyethylene and 20% low-density polyethylene.

8. The fluid detection system of claim 6 wherein said solid, non-porous dielectric material coating is composed of the same material as the at least one solid non-porous dielectric element.

9. A fluid detection method consisting essentially of the steps of
locating a coaxial fluid detection cable in a region where the intrusion of a fluid is to be detected,
applying an electrical signal to said coaxial cable,
allowing fluid intruding into said region to pass directly from said region through an open braided outer conductor of said coaxial fluid detection cable and into a dielectric layer of said coaxial fluid detection cable which is comprised of only solid, non-porous dielectric material including at least one dielectric element which is helically disposed around an inner conductor of said coaxial fluid detection cable to form a spirally extending air gap, the intrusion of the fluid into said spirally extending air gap changing the characteristic impedance of said coaxial cable, and said air gap being defined for quickly and thoroughly exhausting fluid from said coaxial fluid detection cable,
detecting a change in the characteristic impedance of said coaxial fluid detection cable in response to said signal to detect the intrusion of a fluid into the region where said coaxial cable is located.

10. A fluid detection method consisting essentially of the steps of
locating a coaxial fluid detection cable in a region where the intrusion of a fluid is to be detected,
applying an electrical signal to said coaxial cable,
allowing fluid intruding into said region to pass directly from said region through an open braided outer conductor of said coaxial fluid detection cable and into a dielectric layer of said coaxial fluid detection cable which is comprised of only solid, non-porous dielectric material including at least one dielectric element which is helically disposed around an inner conductor of said coaxial fluid detection cable to form a spirally extending air gap, the intrusion of the fluid into said spirally extending air gap changing the characteristic impedance of said coaxial cable, and said air gap being defined for quickly and thoroughly exhausting fluid from said coaxial fluid detection cable,
detecting a change in the characteristic impedance of said coaxial fluid detection cable in response to said signal to detect the intrusion of a fluid into the region where said coaxial cable is located, and
removing fluid from said coaxial fluid detection cable by separating said coaxial fluid detection cable from said fluid so that said fluid flows quickly from said spirally extending air gap through said open braided outer conductor.

* * * * *